(12) United States Patent
Karabulut et al.

(10) Patent No.: US 8,611,439 B2
(45) Date of Patent: Dec. 17, 2013

(54) SYSTEM AND METHOD TO OPTIMIZE MULTICARRIER COMMUNICATION

(75) Inventors: Gunes Karabulut, Ottawa (CA); John Fanson, Ottawa (CA); Yu Wang, Kanata (CA)

(73) Assignee: Edgewater Computer Systems, Inc. (CA)

( * ) Notice: Subject to any disclaimer, the term of this patent is extended or adjusted under 35 U.S.C. 154(b) by 429 days.

(21) Appl. No.: 11/770,461

(22) Filed: Jun. 28, 2007

(65) Prior Publication Data

US 2009/0003468 A1    Jan. 1, 2009

(51) Int. Cl.
*H04K 1/10*   (2006.01)

(52) U.S. Cl.
USPC ............ 375/260; 375/316; 375/295; 375/296

(58) Field of Classification Search
USPC .......... 375/260, 377, 316, 296, 295; 370/464, 370/333
See application file for complete search history.

(56) References Cited

U.S. PATENT DOCUMENTS

| | | | |
|---|---|---|---|
| 5,852,633 A * | 12/1998 | Levin et al. ................. | 375/130 |
| 6,512,797 B1 * | 1/2003 | Tellado et al. .............. | 375/261 |
| 6,798,735 B1 | 9/2004 | Tzannes et al. | |
| 6,904,082 B2 | 6/2005 | Jones | |
| 7,292,552 B2 * | 11/2007 | Willenegger et al. ......... | 370/333 |
| 2004/0004936 A1 * | 1/2004 | Ginesi et al. .................. | 370/210 |
| 2005/0053164 A1 * | 3/2005 | Catreux et al. ............... | 375/260 |
| 2005/0135497 A1 * | 6/2005 | Kim et al. ..................... | 375/267 |

* cited by examiner

Primary Examiner — Leila Malek
(74) Attorney, Agent, or Firm — Hayes Soloway P.C.

(57) ABSTRACT

A system and method for allocating transmitter power to subcarriers of a multicarrier signal is provided. First, the subcarriers are transmitted with an initial set of power levels and an initial set of constellation assignments. Next, quantized SNR metric values are measured at the receiver for each subcarrier. The measured subcarrier quantized SNR metric is compared with the respective allocated constellation quantized SNR metric, for determining the excess SNR per subcarrier. The transmitter power of the subcarriers whose excess SNR is above a predetermined threshold is adjusted, while keeping the total transmitter power constant. The transmitter power may be adjusted for increasing throughput or robustness of the system. For increased accuracy, several training frames may be used. Advantageously, only constellations equally spaced, such as square or cross constellations, are used. According to a preferred embodiment, OFDM/DMT multicarrier system use IFFT prescalers in the transmitter power adjustment.

15 Claims, 8 Drawing Sheets

SYSTEM AND METHOD TO OPTIMIZE MULTICARRIER COMMUNICATION

STATEMENT REGARDING FEDERALLY SPONSORED RESEARCH OR DEVELOPMENT

This invention was made with Government support under Contract FA8626-06-D-2083 awarded by the United States Air Force. The Government has certain rights in the invention.

BACKGROUND OF THE INVENTION

In various wired or wireless networks, communication channels may be corrupted by various channel conditions, such as severe fading, strong intersymbol interference, dispersion etc. Adaptation of transmit signals to the channel conditions can bring a large improvement to the transmission rate, therefore enhancing the capacity of the transmission, as well as to the reliability of the transmission, therefore enhancing its robustness.

In a multicarrier system, the communication channel is partitioned into parallel independent subchannels or subcarriers, the partitioning being achievable through various methods, such as using Discrete Fourier Transform (DFT). In some cases, for a fading channel, partitioning is obtained by assuming independent and identically distributed fading statistics.

Two common forms of multicarrier modulation serving as the basis for several wireless and wired standards are Orthogonal Frequency Division Multiplexing (OFDM) and Discrete Multi-tone Modulation (DMT). Both of these techniques use DFT to achieve independency of subchannels. In these techniques, each sub-carrier can be independently modulated by using a linear modulation technique such as Binary Phase Shift Keying (BPSK), Quadrature Phase Shift Keying (QPSK) and M-ary quadrature amplitude modulation (M-QAM).

The schemes for assigning energy and bits to subcarriers, associated with these multicarrier modulation techniques, are known as loading algorithms. For example, U.S. Pat. No. 6,798,735 to Tzannes et al and U.S. Pat. No. 6,904,082 to Jones, incorporated herein by reference, describe common bit loading algorithms know in the art, such as Hughes-Hartogs and Chow et al., as well as two recent prior-art multicarrier bit allocation scheme. With respect to energy loading, the waterfill or water pouring algorithm is a spectral shaping scheme for distributing energy or transmitter power among subcarriers. "Water pouring" was introduced by Gallager in 1968 ("Information Theory and Reliable Communication", page 389) and by Wozencraft in 1965 ("Principles of Communication Engineering", pp. 285-357). In general, water pouring involves distributing the energy of the transmission signal according to the channel frequency response curve, which in some cases, such as systems mostly subjected to additive white Gaussian noise (AWGN), can be seen as a plot of the signal to noise ratio (SNR) as a function of frequency. The frequency response curve is inverted and the available signal energy (the "water") is "poured" into the inverted curve so that more of the energy is distributed into those portions of the channel having the highest signal to noise ratio. In a multicarrier system in which the transmission band is divided into numerous subchannels, throughput can be maximized by putting as many bits in each subcarrier as can be supported given the "water pouring" energy and a desired error rate. The waterfill algorithm is known to be difficult to implement in practice.

SUMMARY OF THE INVENTION

A system and method for allocating transmitter power to subcarriers of a multicarrier signal are provided. First, the subcarriers are transmitted with an initial set of power levels and an initial set of constellation assignments. Next, quantized SNR metric values are estimated at the receiver for each subcarrier. Following, the estimated subcarrier quantized signal to noise ratio (SNR) is compared with the respective allocated constellation quantized SNR metric, for determining the excess SNR per subcarrier. The transmitter power of the subcarriers whose excess SNR is above a predetermined threshold is adjusted, while keeping the total transmitter power constant. The process may be repeated until predefined expectations are met. The transmitter power may be adjusted for increasing either throughput or robustness of the system, or a combination of both. Advantageously, following quantized SNR metric estimation and prior to transmitter power adjustment, an improved constellation set that meets the required BER (bit error rate) can be assigned to each subcarrier, replacing the initial set, via a bit loading algorithm. For increased accuracy of quantized SNR metric estimation, several training frames may be used. According to the preferred embodiments, quantized SNR metric estimation is achieved via BER counters.

Advantageously, only constellations equally spaced, such as square or cross constellations, can be used. According to a preferred embodiment, OFDM/DMT multicarrier system use IFFT (Inverse Fast Fourier Transform) prescalers in the transmitter power adjustment.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
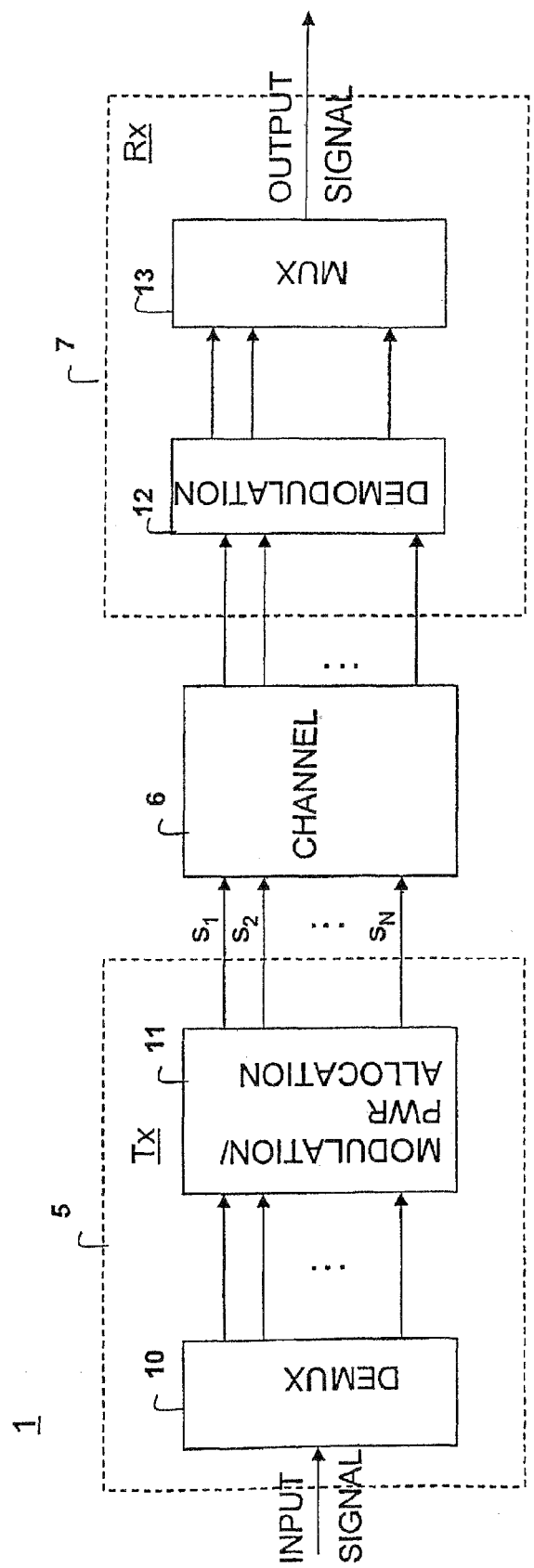
FIG. 1 is a block diagram of a multicarrier communication system.

FIG. 1 illustrates a multicarrier communication system 1, comprising a transmitter 5 for transmitting an input signal or bit stream over a channel or communication medium 6 to a receiver 7 using a plurality of available subchannels or subcarriers, $s_1, \ldots s_N$. Within the transmitter 5, a demux/bit allocation block 10 divides the input signal into a plurality of sub-signals or bit sub-streams. Each subcarrier $s_i$ has an associated spectral allocator $f_i$. The sub-signals are modulated with the spectral allocators and the total transmitter power is allocated to the modulated sub-signals using a modulation/power allocation block 11. The modulated sub-signals are further transmitted over the channel 6, using the available subcarriers, to the receiver 7, where they are demodulated by a demodulation block 12 and further combined into an output signal by a mux block 13.

Figure 2:
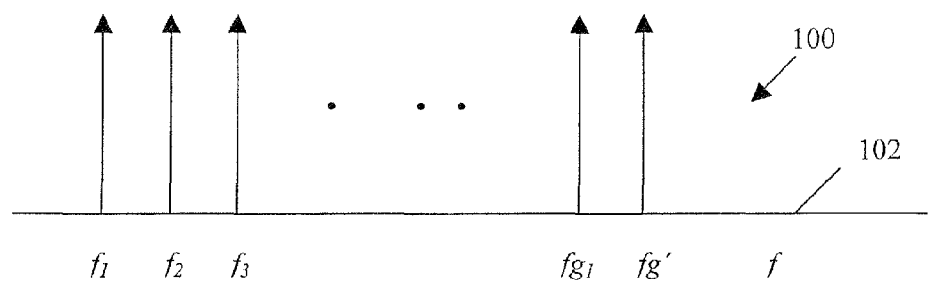
FIG. 2 is a graph illustrating subcarriers associated with a multicarrier signal, as represented by central frequencies.

Referring to FIG. 2, a graph 100 illustrates subcarriers $s_1, \ldots s_N$ associated with a multicarrier signal, as represented by spectral allocators or central frequencies $f_1, f_2, \ldots f_N$. Each of the subcarriers is capable of carrying a certain number of bits of information. The total number of bits transmitted via the multicarrier signal is the sum of the number of bits transmitted by each of the subcarriers.

The demux/bit allocation block 10 can use various encoding and bit allocation schemes. In the preferred embodiment, the demux/bit allocation block 10 uses quadrature amplitude modulation (QAM) to encode each of the sub-signals, but other linear modulation techniques such as MPSK (M-ary Phase Shift Keying) are suitable alternatives. In using QAM, each sub-signal is encoded to correspond to an amplitude and phase combination within a selected QAM constellation. In particular, a sub-signal of M bits requires encoding on a constellation having a size greater than or equal to $2^M$.

In associating the QAM encoded sub-signals with available subcarriers, the system design must account for the fact that for each subcarrier, the maximum size of the associated QAM constellation, and hence the maximum number of bits that can be transmitted via that subcarrier, is a function of the signal to noise ratio (SNR) of the subcarrier as well as a function of the maximum receiver bit error ratio (BER). The BER is the number of single bit transmission/reception errors per the total number of bits transmitted. Increasing the number of discrete amplitudes and/or phases associated with a particular sub-carrier, i.e., increasing the constellation size on which the sub-signal is encoded while keeping the average energy fixed increases the likelihood of bit errors. The BER increases with increasing constellation size because, as the number of discrete amplitudes and/or phases increases, the magnitude of the difference between discrete phases and/or amplitudes decreases and hence the ability of the receiver to distinguish between different phase and/or amplitude values decreases.

The relationship between BER and SNR for various QAM constellations is known in the art of multicarrier communication. The accuracy of the relationship is dependent on accurate knowledge of the sources of noise impacting the subcarriers. Tables are available that show the minimum SNR that can support a BER of a fixed amount or less for a given constellation size, for known noise statistics, such as Additive White Gaussian Noise (AWGN). For example, the table below from U.S. Pat. No. 6,798,735 to Tzannes et al, incorporated herein by reference, shows typical values of constellation SNR, defined as the minimum SNR needed to transmit a constellation having the indicated size in order to obtain an expected BER of $10^{-7}$. Note that as the constellation size increases, the minimum required SNR also increases.

| Constellation size c (in bits) | SNR requirements |
|---|---|
| 2 | 4 dB |
| 3 | 19 dB |
| 4 | 21 dB |
| 5 | 24 dB |

Figure 3:
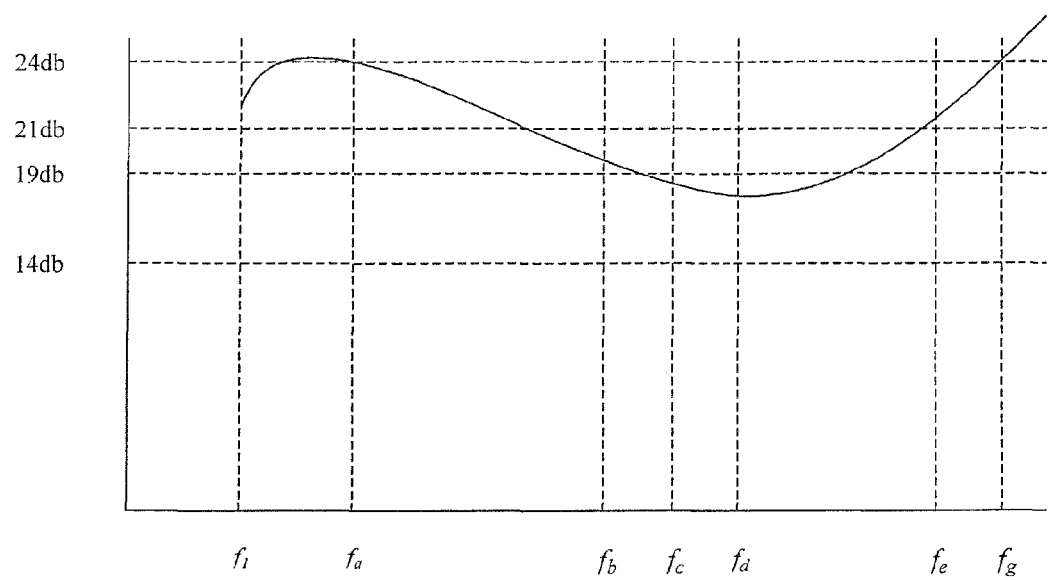
FIG. 3 is a graph for a hypothetical relationship between SNR and frequency for a multicarrier communication system.

Referring to FIG. 3, a graph 120 uses a plot 122 to illustrate a hypothetical relationship between SNR and frequency for a communication channel transmitting a multicarrier signal having subcarriers with central frequencies between $f_1$ and $f_j$. The vertical axis of the graph 120, which represents SNR, has superimposed thereon the SNR requirement numbers from the table, shown and discussed above, that relates minimum SNR requirements with constellation size for a BER of $10^{-7}$. The graph 120 shows that an SNR of 14 dB is required to support a constellation size of two bits and that SNR's of 19, 21, and 24 are required to support constellation sizes of three, four, and five bits, respectively. Based on this, it is possible to use the plot 122 to determine a maximum constellation size for each of the carrier frequencies between $f_1$ and $f_j$. For example, plot 122 shows that any carrier frequencies between $f_1$ and $f_a$ can support a maximum constellation size of four bits since all portions of the plot 122 between $f_1$ and $f_a$ are greater than 21 dB. The difference between the minimum SNR required by the constellation associated with the subcarrier and the actual transmission subcarrier SNR is defined as the excess SNR or margin for that subcarrier.

Given a required BER for the system, subsignals can be allocated to constellations and to subcarriers based on the measured SNR such as to maximize capacity, by transmitting the maximum number of data bits possible per subcarrier, or to increase robustness, by maximizing the margin for each subcarrier or a combination of the two.

However, in many multicarrier communication applications, there are hundreds of carriers and hundreds to thousands of bits that are transmitted. In addition, it is necessary to allocate subsignals to constellations and subcarriers based on measured SNR in a relatively rapid manner since time spent for these processes, i.e training to attain improved performance, is time not spent communicating information. Furthermore, it may be necessary to reallocate the bits to appropriate constellations and subcarriers during communication if the channel transmission characteristics and therefore the channel SNR change dynamically. Therefore, association of subsignals with appropriate constellations and subcarriers must be done in a simple and effective manner.

Since the SNR of subcarriers is dependent on the power allocated to each subcarrier, allocation of subsignals to various constellations and to subcarriers is dependent on the transmitter power available to that subcarrier. A simplified method of allocating transmitter power to subcarriers can be achieved using quantized SNR metric estimates.

Figure 4:
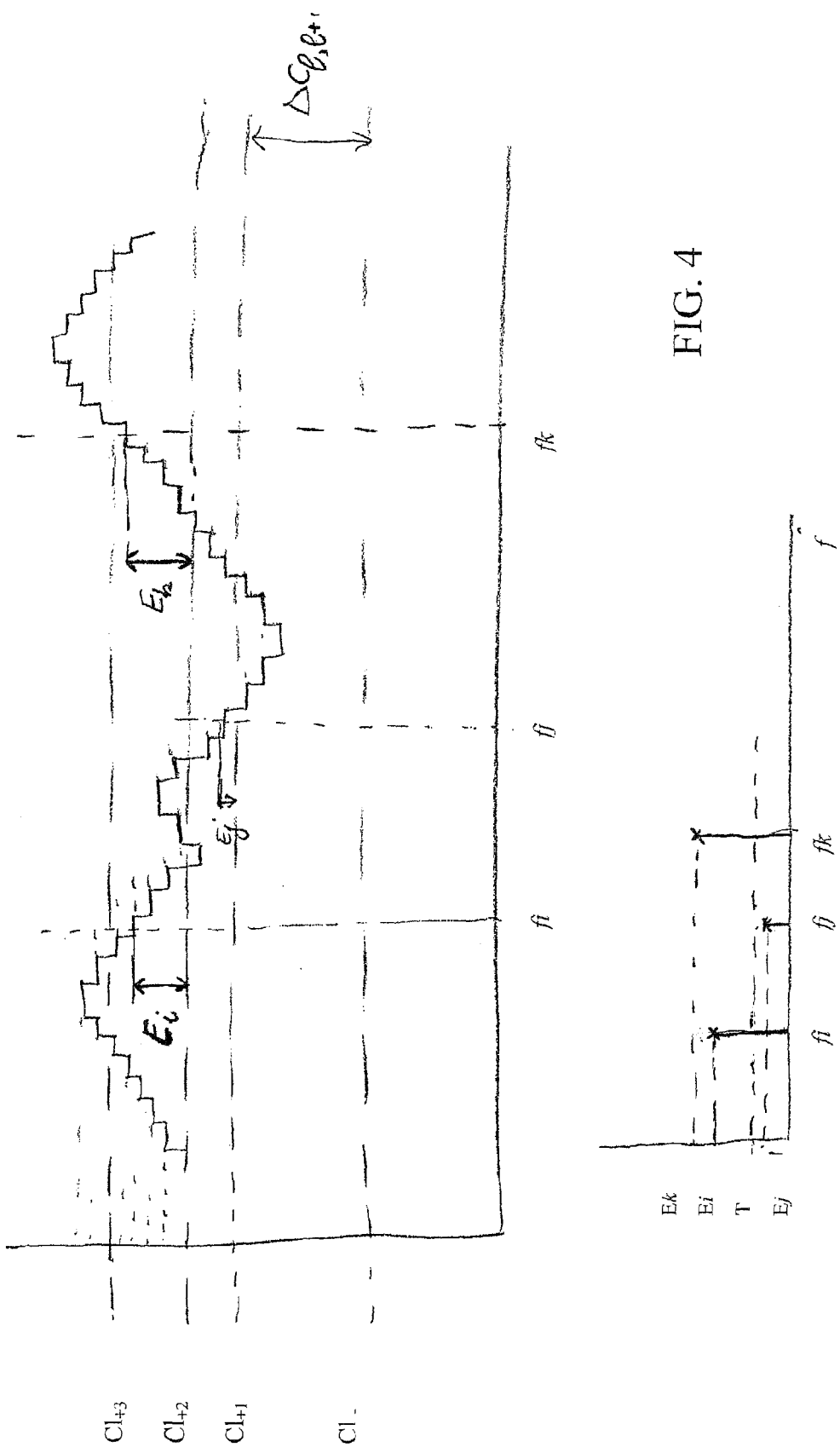
FIG. 4 is a graph illustrating a plot of quantized SNR metric for a multicarrier communication system.

SNR is often not measured directly and other related metrics can be measured instead, such as received signal power. Therefore, an SNR related metric can be equivalently used in embodiments of the invention. FIG. 4 illustrates a hypothetical relationship between subcarriers of a multicarrier signal and quantized SNR metric values, for a given state of the transmitted signal, i. e. based on a given transmitted power level for each subcarrier and a given constellation allocated to each subcarrier. The term quantized SNR metric will be understood herein to represent a predetermined set of discrete, quantized values of any SNR related metric that can be estimated at the receiver, with respect to various subcarriers.

For simplicity, a fixed quantization step between various SNR metric levels will be assumed in the rest of the description, however, it will be appreciated by those skilled in the art that such a restriction is not intended to be limiting. SNR metric values are known a priori for constellations, as discussed above, and associated quantized SNR metric values can be derived once the quantization level are known. Quantized SNR metric values for subcarriers are measured at a given point in the link, such as at the receiver. Quantized SNR metric levels of four consecutive constellations $C_l$, $C_{l+1}$, $C_{l+2}$ and $C_{l+3}$ respectively, in relation to center frequencies of three sub-carriers, $f_i$, $f_j$, $f_k$, respectively, are shown. The three sub-carriers in FIG. 4 have respective excess quantized SNR metric values, $E_i$, $E_j$ and $E_k$. A constellation quantized SNR metric gap $\Delta C_{l,l+1}$ is defined as the quantized SNR metric gap between consecutive constellations, $C_l$ and $C_{l+1}$.

Figure 5B:
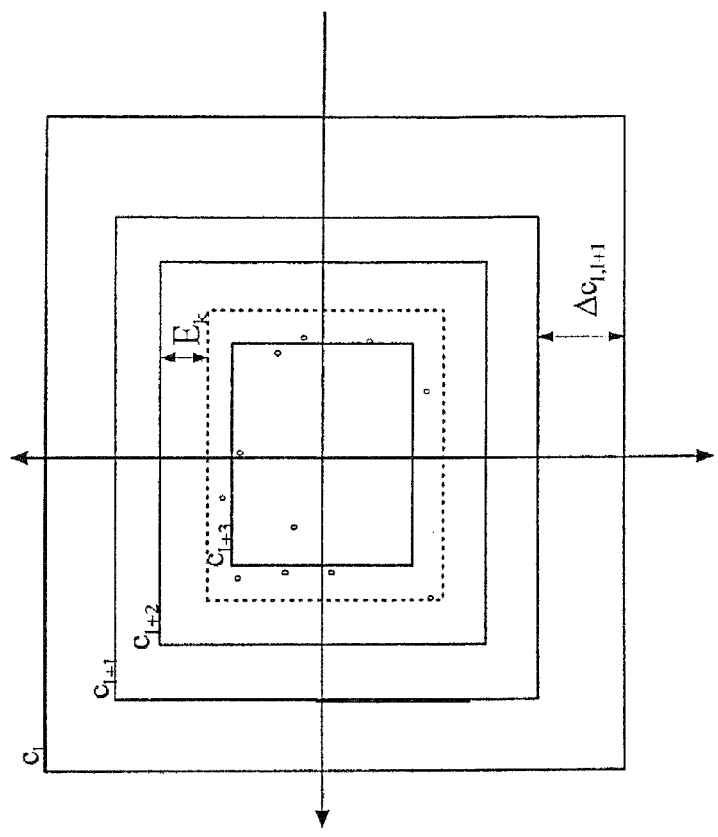
FIGS. 5A and 5B are two-dimensional graphs illustrating distribution of quantized SNR metric estimated values for signals assigned to sub-carriers j and k, respectively, of FIG. 4, with respect to error decision boundaries for constellations $C_1$ to $C_{1+3}$ in FIG. 4.
Figure 5A:
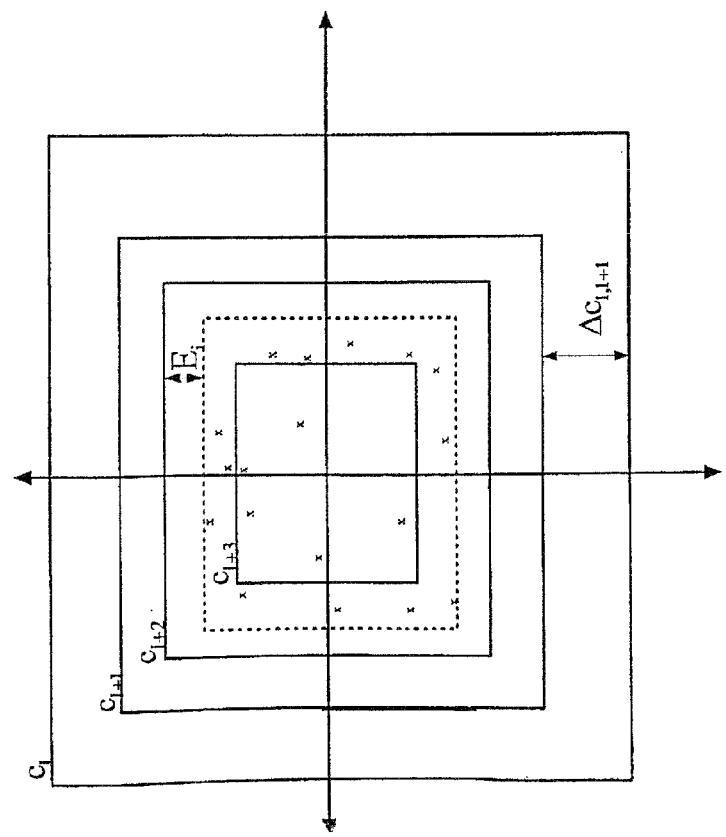

FIGS. 5A and 5B are two-dimensional graphs illustrating distribution of quantized SNR metric estimated values for signals assigned to sub-carriers j and k, respectively, in FIG. 4, with respect to error decision boundaries for constellations $C_l$ to $C_{l+3}$ in FIG. 4. Any point that is outside a particular decision boundary is a symbol error for that modulation level and a BER counter can keep track of such an error.

Figure 6:
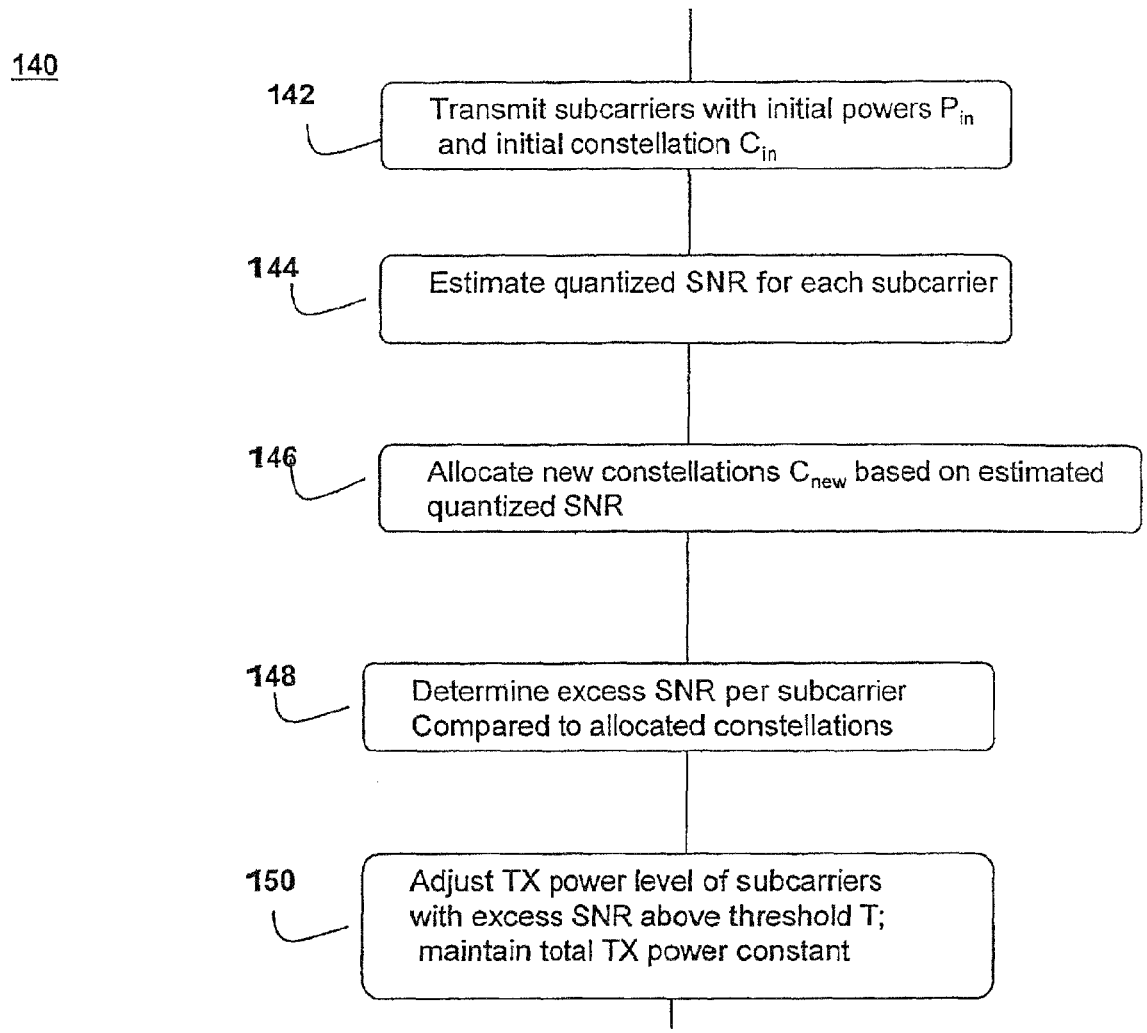
FIG. 6 is a flow chart of a method of allocating transmitter power to subcarriers of a multicarrier communication system.

Referring also to FIG. 6, a flow chart 140 for a method for allocating transmitter power to subcarriers of a multicarrier signal is illustrated. Processing begins at a first step 142 where the subcarriers are transmitted with an initial set of power levels, $P_{in}(i)$, i=1, ... ,N and an initial set of constellation assignments, $C_{in}(i)$ i=1, ... N. The initial constellation assignments are preferably small size constellations, such as QPSK, in an attempt to satisfy BER requirement. Next, at step 144, quantized SNR metric values, $\overline{SNR}(s_i)$, i=1, ... N, are estimated at the receiver for each subcarrier. In the preferred embodiments, step 144 is followed by step 146 where new and usually larger size constellations $C_{new}(i)$, where i=1, ... N that meet the required BER can be assigned to subcarriers via a bit loading algorithm. However, note that a change to a different constellation for all subcarriers, or even for a subset of them is not mandatory. Therefore, it is possible to have $C_{new}(i)=C_{in}(i)$, for some or for all i=1, ... N. Following step 146 is a step 148 where for each subcarrier, the measured subcarrier quantized SNR metric is compared with the respective currently allocated constellation quantized SNR metric, $\overline{SNR}(C(s_i))$, for determining the excess quantized SNR metric per subcarrier $E(s_i)$ as $$E(s_i)=\overline{SNR}(s_i)-\overline{SNR}(C(s_i)).$$

Following step 148 is a step 150 of adjusting the transmitter power of the subcarriers whose excess SNR is above a predetermined threshold, T, to new power levels, $P_{new}(i)$, i= 1, ... N, while keeping the total transmitter power constant. For example, in FIG. 4, subcarriers $f_i$ and $f_k$ are considered to have an excess quantized SNR metric above threshold T and subcarrier $f_j$ is considered to have an excess quantized SNR metric level below T. Following the power adjustment, some subcarriers may change constellations. The process may be repeated until a set of predefined expectations, such as throughput or robustness, are met.

The initial power levels $P_{in}(i)$, i=1, ... ,N transmitted at step 142 may all be equal or selected according to a predetermined profile. Measurement of SNR metric quantized levels for subcarriers performed in step 144 may be done by any means known in the art, such as via BER counters. As previously mentioned, obtaining accurate SNR metric estimates from a BER measurement is dependent on knowledge of all noise sources and associated noise statistics. Although it may be possible to obtain a robust common metric for all types of noise statistics, these may change when power is redistributed. In some cases, the accuracy of SNR metric estimation using BER counters, can be increased using subsequent BER measurements based on two or more initial subcarrier power sets. According to one embodiment, $1+\lfloor 10^{(X/10)} \rfloor$ training transmissions or trial demodulations may take place: a first training transmission in which every $1+\lfloor 10^{(X/10)} \rfloor$—th subcarrier is transmitted with X dB over the average and the rest of the subcarriers are transmitted with X dB below the average power. This process can be repeated until every subcarrier is transmitted once with +X dB power over the average. At the end of these trial demodulations, the set of excess SNR metric values are processed. Alternately, error decision boundaries, such as illustrated in FIGS. 5A and 5B, tightly spaced apart, or, equivalently, a high density of BER counters corresponding to such decision boundaries, could be used for accurate measurements, eliminating the need for several training frames, regardless of the noise statistics.

Without limitation, an exemplary training processing is as follows: Initially, a known modulated signal, such as via QPSK, is transmitted to stimulate the channel. The receiver conducts a "trial demodulation" on the training packet and directly calculates the number of bit errors it would have obtained for all constellations (BPSK, QPSK, ... 4096 QAM) had that been a data packet. The bit errors are computed based on decision boundaries and based on know coding schemes, such as Grey coding scheme with a maximum of 6 bit errors per symbol for QAM 64 and above. The decision boundaries can be programmable. Defining more decision boundaries than constellation decision boundaries allows for implementation of high resolution BER counters and associated BER estimation. BER counters are limited to a maximum number of bits, such as of 4, before saturation.

According to one embodiment, the transmitter power allocation at step 150 can be used to enhance transmission rate, by giving more power to a subset $K_1$ of subcarriers from the set of subcarriers with excess quantized SNR above threshold, K, and decreasing the power of complementary subset, $K_2=\{K\backslash K_1\}$. In particular, in looking at a subcarrier or tone that has sufficient SNR for a particular constellation (with sufficient low BER) but not enough to move up 1 constellation level (2 bits), the power can be borrowed from another tone for which the SNR is more than enough for that particular modulation level (and BER) and can be reduced by some amount.

Alternately, the method can be used to enhance robustness, by increasing the excess or margin SNR per subcarrier, according to preset requirements. It will be noted that a way of increasing robustness for the entire system would be to try to redistribute transmission power such that all subcarriers have similar SNR margin values. Alternately, more SNR margin can be built into selected subcarriers, at the expense of others, if communication via those subchannels is required to be more robust, in particular. Moreover, the algorithm can be adjusted such that both the transmission rate and the robustness are enhanced by allocating transmitter powers as described above.

Figure 7:
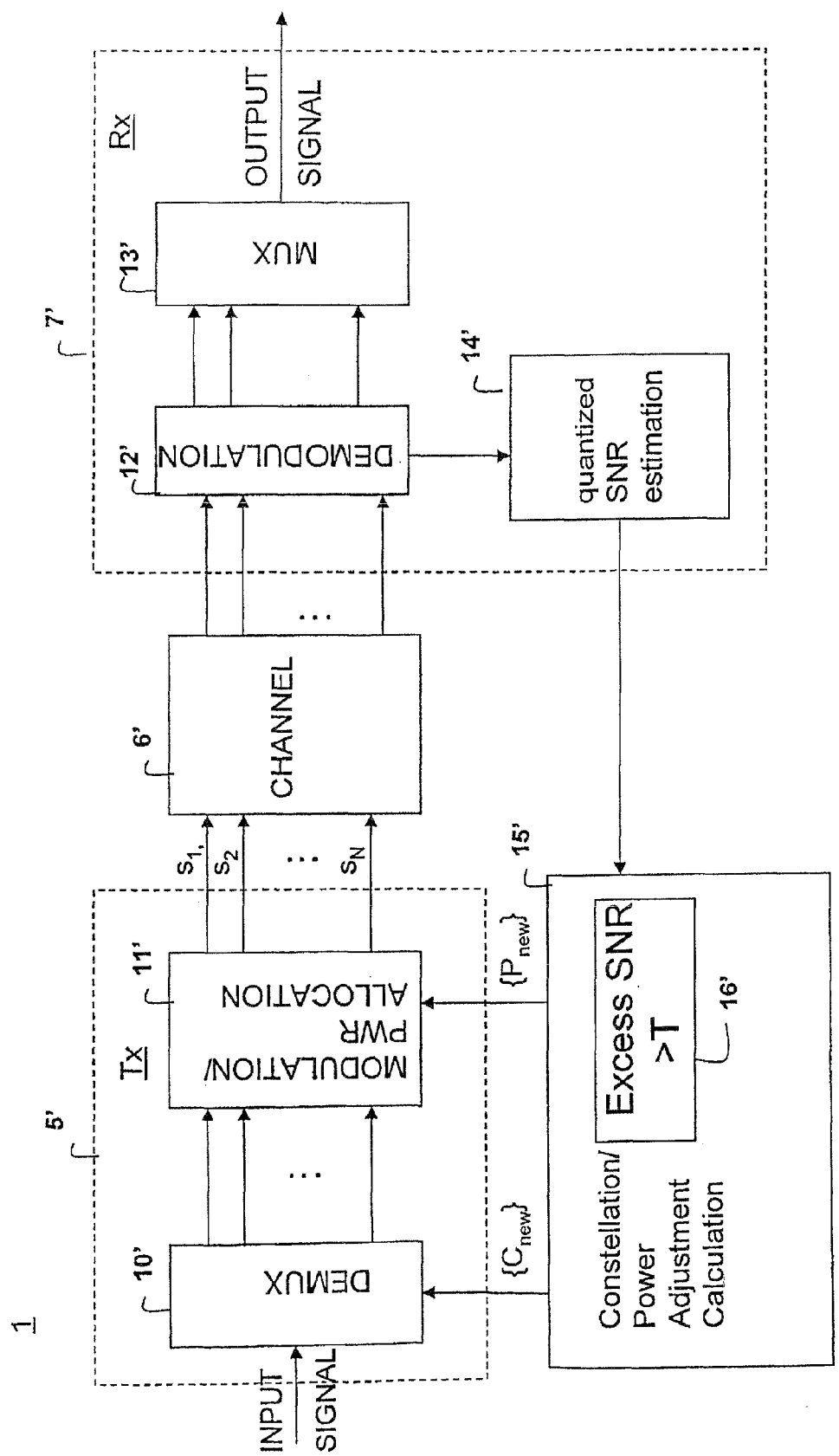
FIG. 7 is a block diagram of a multicarrier communication system allowing for transmitter power allocation to subcarriers according to embodiments of the invention.

FIG. 7 illustrates a multicarrier communication system 1' capable of implementing the method of FIG. 4, in allocating power to the plurality of subcarriers. Parts analogous to those in multicarrier system 1 in FIG. 1 are denoted by like numerals. Within a receiver 7', a quantized SNR metric estimation block 14' measures the quantized SNR metric for each subcarrier allowing for determination of the excess quantized SNR metric compared to the SNR of the associated constellation. A constellation/power adjustment calculation block 15' uses the quantized SNR metric values measured for each subcarrier to decide on a possible new constellation assignment set $\{C_{new}\}$ and a possible new power assignment set $\{P_{new}\}$. Decisions regarding a new constellation assignment set $\{C_{new}\}$ take into account required BER for the system and are communicated to a demux block 10'. A comparator 16' is used in deciding whether the excess quantized SNR metric values of subcarriers exceed a given threshold T and decisions regarding a new power assignment set $\{P_{new}\}$ are made and communicated to a modulation/power allocation block 11'.

Transmitter power adjustment for subcarriers with excess SNR above a threshold can be implemented through various methods that will be recognized by those skilled in the art. Advantageously, for OFDM/DMT systems, IFFT prescalers can be used, as discussed next. A block diagram of an OFDM/DMT system using IFFT prescalers for transmission power adjustments is shown in FIG. 7. Parts analogous to those in multicarrier systems 1 and 1' in FIGS. 1 and 6, respectively, are denoted by like numerals. In this implementation, the channel SNR is changed by multiplication of corresponding tones of subcarriers by different scalar values, referred to as IFFT (Inverse Fast Fourier Transform) prescalers. N represents the total number of subcarriers, $p_i$ represents the prescaler corresponding to ith subcarrier tone. Transmitted subcarrier tones and their received estimates are represented by $d_i$ and $\hat{d}_i$, respectively.

For an OFDM system with N subcarriers, let the set $\{p_i\}$ for i=1, . . . ,N, denote the set of IFFT prescaler values. In order to keep the total transmit power fixed, the constraint $$\frac{1}{N}\sum_{i=1}^{N} p_i^2 = 1$$

must be satisfied.

Square-constellations/Cross-constellations

Limitation to use of constellations equally spaced apart in terms of SNR levels, such as square constellations (size $2^M$, M even positive integer) or cross constellations (size $2^M$, M odd positive integer) is beneficial from the point of view of complexity of implementation, as detailed next. Due to symmetry considerations with respect to an IQ plane, for QAM modulated sytems $2^M$, M=0, 1, 2, 4, 6, 8, . . . is also an advantageous implementation.

Figure 8:
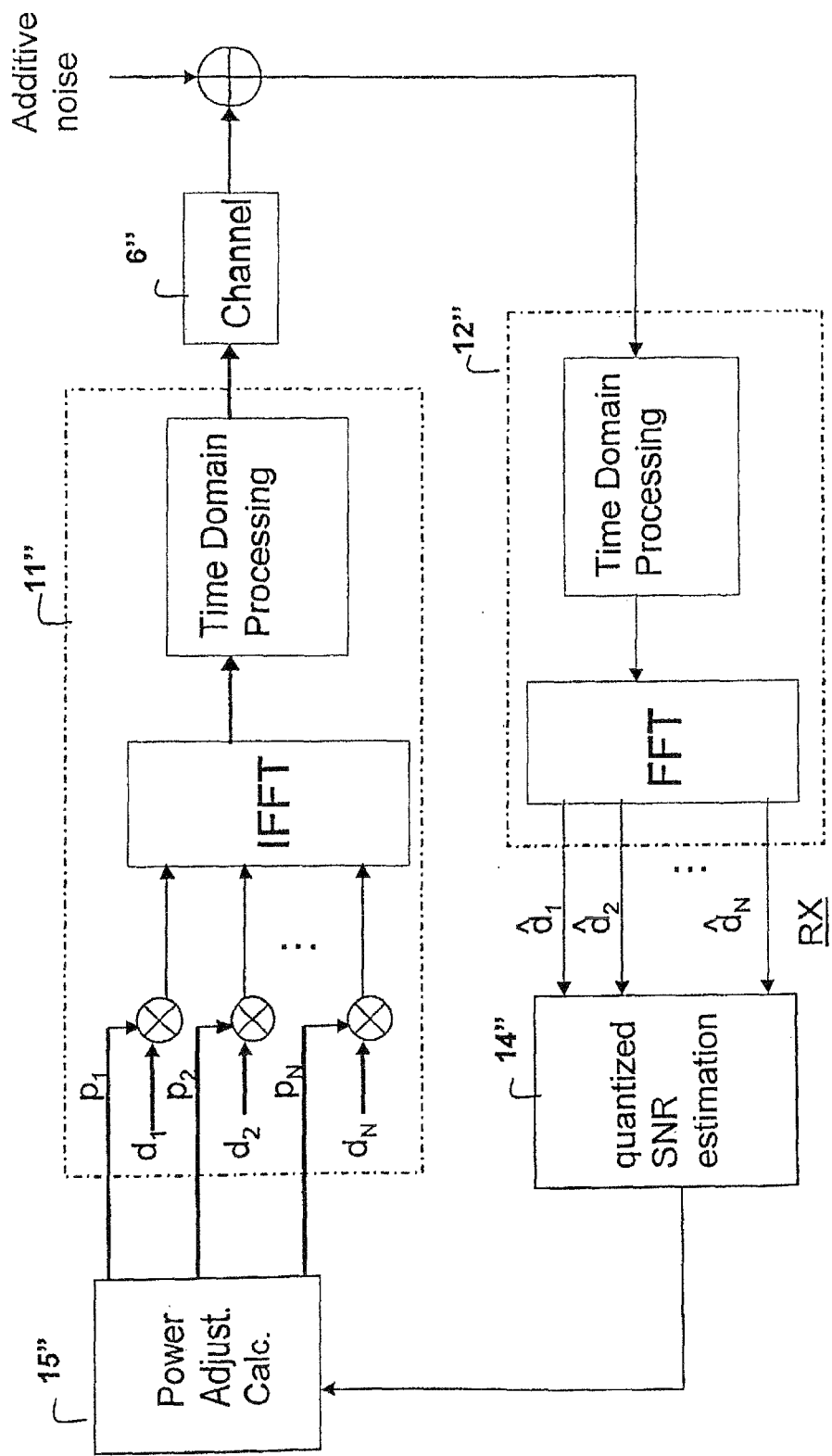
FIG. 8 is a block diagram of an OFDM/DMT multicarrier communication system using IFFT prescalers for implementing transmitter power adjustments.
Figure 9:
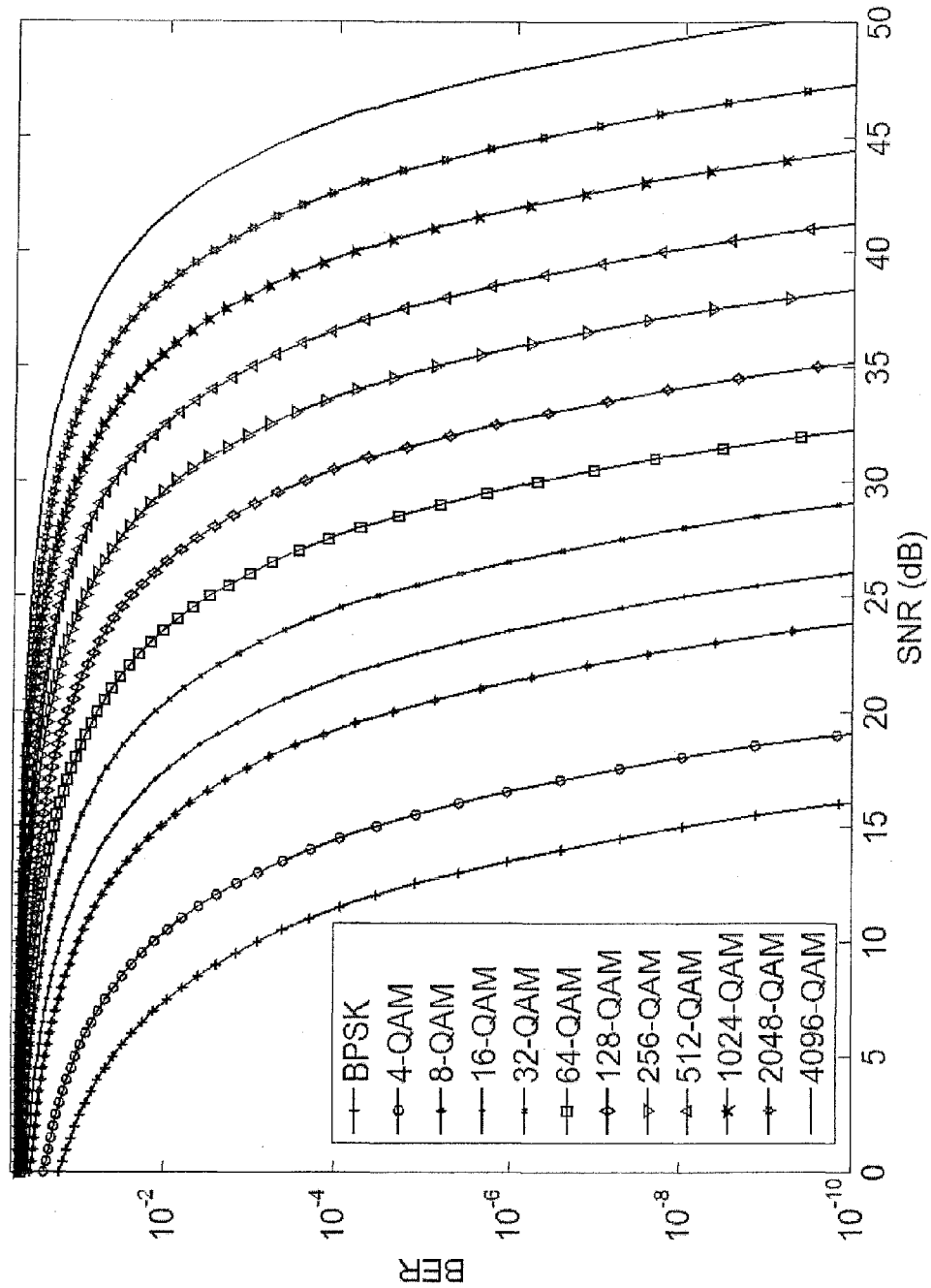
FIG. 9 is a graph illustrating bit error rate (BER) vs signal-to-noise ratio (SNR) curves of BPSK to 4096-QAM constellations

Bit error rate (BER) vs signal-to-noise ratio (SNR) curves of BPSK to 4096-QAM constellations, including unit energy cross constellations are shown in FIG. 8. It can be observed that for a constant BER, there is approximately a 6 dB difference, between either two consecutive square constellations or two consecutive cross constellations. Therefore, if only square constellations or only cross constellations are used, each sub-carrier may have an excess energy in the range of [0, 6) dB. Use of only square constellations is preferable as they allow for a simpler receiver implementation, due to their symmetry.

According to the preferred embodiment, the goal of IFFT prescaler adjustments is to exploit the 6 dB difference between two consecutive square constellations. The adjustment exploits the tones that have +3 dB to +6 dB higher SNR than the constellation that they are assigned to. Additional 3 dB power can be added to these tones to move them up to the next constellation in order to increase capacity. The same required −3 dB power must also be taken from this set in order to keep the transmit power constant. The power of tones that have an additional SNR of 0-3 dB should remain the same, since any reduction from these will reduce the constellation order, whereas adding 3 dB will not change the constellation.

Let the SNR quantization step be X dB. Note that the difference between two square constellations is around 6 dB for an acceptable bit error rate. Hence, there exist $\lceil 6/X \rceil$ different excess SNR levels, where $\lceil\ \rceil$ represents the floor function. Different rules can be derived to keep the transmit power fixed. One example is as follows: For each subcarrier, whose power is increased by X dB, the power of $$y = \left\lceil \frac{10^{(X/10)} - 10^{(2X/10)}}{1 - 10^{(X/10)}} \right\rceil = \lceil 10^{(X/10)} \rceil$$

subcarriers must be reduced by X dB. In order to increase the total transmission rate, the subcarrier whose power is increased by X dB, should have an excess quantized SNR metric of 6-X dB, and the other subcarriers whose power is reduced by X dB must have a minimum excess SNR greater than X dB.

Advantageously, a 3 dB quantization step and threshold value can be selected. In order to enhance the transmit power of a subcarrier by +3 dB, its prescaler value is set to $2^{0.5}$. This corresponds to the reduction of the transmit power of 2 subcarriers to $2^{-0.5}$. The total transmit power of 3 subcarriers is $1\times(2^{0.5})^2+2\times(2^{-0.5})^2=3$, therefore, the average transmit power is kept constant.

Furthermore, the exemplary training processing in this case would occur as follows: The modem can transmit first a training frame with every third tone with additional 3 dB power and reducing the power of the rest of the tones by 3 dB. A second and a third frame with the opposite tones 3 dB higher and the complementary set 3 dB lower, so that the average power is the same, would follow. Note that for flat channels with highly correlated subchannel actual SNR values, such as wireline channels with AWGN, estimated quantized SNR metric at the end of the first frame could be interpolated, eliminating the need for second and third frame transmissions.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. In a multicarrier communication system including a transmitter and a receiver, a method for allocating power to a plurality of subcarriers of a communication channel between the transmitter and the receiver at a required bit error rate, the method comprising the steps of:
   a. transmitting said plurality of subcarriers with an initial set of power levels and an initial set of constellation assignments;
   b. measuring at the receiver a quantized Signal to Noise Ratio (SNR) metric value for each subcarrier;
   c. for each subcarrier, comparing the measured subcarrier quantized SNR metric value with a quantized SNR metric corresponding to the respective currently allocated constellation, for determining an excess SNR per subcarrier; and
   d. adjusting the transmitter power of the subcarriers whose excess SNR is above a predetermined threshold while keeping the total transmitter power constant, wherein adjusting the transmitter power comprises increasing the excess quantized SNR metric of selected subcarriers whose excess SNR is above the predetermined threshold for allowing said selected subcarriers to be allocated to respective denser constellations than their respective currently allocated constellations, wherein adjusting the transmitter power of the subcarriers whose excess SNR is above predetermined threshold comprises allocating more power to subcarriers with excess SNR above a subthreshold higher than said predetermined threshold and decreasing the power of complementary set.

2. The method as in claim 1, further comprising re-assigning new constellations to subcarriers, based on the required bit error rate and on said measured subcarrier quantized SNR metric value.

3. The method as in claim 1, wherein the communication between transmitter and receiver uses Orthogonal Frequency Division Multiplexing (OFDM) encoded signals.

4. The method as in claim 1, wherein the communication between transmitter and receiver uses Discrete Multi-tone Modulation (DMT) encoded signals.

5. The method as in claim 1, wherein measurement of quantized SNR metric at the receiver is performed using Bit Error Rate (BER) counters.

6. The method as in claim 4, wherein measurement of quantized SNR metric at the receiver is performed using high resolution Bit Error Rate (BER) counters.

7. The method as in claim 1, wherein measurement of quantized SNR metric at the receiver is performed using a plurality of training frames.

8. The method as in claim 1, wherein adjusting the transmitter power of the subcarriers whose excess SNR is above predetermined threshold comprises multiplying corresponding tones of said plurality of subcarriers by a set of Inverse Fast Fourier Transform (IFFT) prescaler values.

9. The method as in claim 1, wherein subcarriers are assigned only to square constellations.

10. The method as in claim 1, wherein subcarriers are assigned only to cross-constellations.

11. The method as in claim 8, wherein a quantization step of 3 dB is used in measuring quantized SNR metric levels.

12. The method as in claim 9, wherein a quantization step of 3 dB is used in measuring quantized SNR metric levels.

13. The method as in claim 10, wherein a quantization step of 3 dB is used in measuring quantized SNR metric levels.

14. The method as in claim 9, wherein the steps of measuring quantized SNR metric, allocation new constellations, calculating excess SNR and adjusting the transmitter power are repeated, until predefined expectations met.

15. In a multicarrier communication system, a system for allocating power to a plurality of subcarriers available for carrying data over a channel between a transmitter and a receiver, the system comprising:

a modulation/ power allocation block within the transmitter for associating each of said subcarriers respective constellation assignments and for allocating each of said subcarriers respective power levels;

a quantized SNR metric estimation block within the receiver, for measuring a quantized SNR metric value for each sub carrier and for determining an excess amount of quantized SNR metric by comparing the measured quantized SNR metric value with a predetermined quantized Signal to Noise Ratio (SNR) metric value of the associated constellation; and a power adjustment calculation block, for adjusting the power level of subcarriers having excess SNR above a threshold wherein adjusting the transmitter power comprises increasing the excess quantized SNR metric of selected subcarriers whose excess SNR is above a predetermined threshold for allowing said selected subcarriers to be allocated to respective denser constellations than their respective currently allocated constellations, wherein adjusting the transmitter power of the subcarriers whose excess SNR is above the predetermined threshold comprises allocating more power to subcarriers with excess SNR above a subthreshhold higher than said predetermined threshold and decreasing the power of complementary set.

* * * * *